US010088358B1

(12) United States Patent
O'Driscoll et al.

(10) Patent No.: US 10,088,358 B1
(45) Date of Patent: Oct. 2, 2018

(54) IMPLANTABLE SYSTEMS AND METHODS FOR UV DOSE MONITORING

(71) Applicant: Verily Life Sciences LLC, Mountain View, CA (US)

(72) Inventors: Stephen O'Driscoll, San Francisco, CA (US); Peng Cong, Cupertino, CA (US); Bo Lu, Fremont, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

(21) Appl. No.: 15/234,252

(22) Filed: Aug. 11, 2016

(51) Int. Cl.
*G01J 1/42* (2006.01)
*G01J 1/44* (2006.01)
*A61B 5/00* (2006.01)

(52) U.S. Cl.
CPC ............ *G01J 1/429* (2013.01); *A61B 5/6846* (2013.01); *G01J 1/44* (2013.01)

(58) Field of Classification Search
CPC ..... C12Q 1/005; Y10T 436/11; G04G 21/025; G06F 1/163
See application file for complete search history.

(56) References Cited

U.S. PATENT DOCUMENTS

| 5,731,589 | A | 3/1998 | Sief et al. |
| 6,294,792 | B1 | 9/2001 | Bazsa et al. |
| 6,413,393 | B1 * | 7/2002 | Van Antwerp ......... C12Q 1/005 204/403.11 |
| 6,941,577 | B2 * | 9/2005 | Ackermann ............ A61F 9/067 2/8.8 |
| 9,024,271 | B2 | 5/2015 | Aslam et al. |
| 9,068,887 | B1 * | 6/2015 | Bennouri ................ G01J 1/429 |
| 9,424,957 | B1 * | 8/2016 | Williams ................. G21H 3/02 |

(Continued)

FOREIGN PATENT DOCUMENTS

DE    4012984    10/1991
DE    4435602 A1 * 4/1996  ........... A61N 1/3787
(Continued)

OTHER PUBLICATIONS

Sun Exposure Trackers: UV Trackers—Best Fitness Tracker Reviews, "Best Trackers for . . . Tracking Sun Exposure," Updated Jun. 2, 2015, http://www.bestfitnesstrackerreviews.com/sun-exposure-trackers.html, Aug. 11, 2016 (5 pages).

(Continued)

*Primary Examiner* — Kiho Kim
(74) *Attorney, Agent, or Firm* — Kilpatrick Townsend & Stockton LLP

(57) ABSTRACT

An ultra violet (UV) light dose monitoring system may include an implantable microchip for injection below the surface of a person's skin. The microchip may include a solar cell, a data telemetry transmitter, and a first sensor cell that absorbs UV light that passes through the skin. The system may also include a remote reader. The remote reader may include a data telemetry receiver that receives the data from the microchip and a processor for controlling operation of the remote reader. The data telemetry transmitter may transmit data indicative of a UV light intensity for the UV light absorbed by the first sensor cell to the data telemetry receiver, and the processor may calculate a UV dose based on the data.

21 Claims, 5 Drawing Sheets

(56) References Cited

U.S. PATENT DOCUMENTS

| | | | |
|---|---|---|---|
| 2005/0268962 A1* | 12/2005 | Gaudiana | H01L 25/047 |
| | | | 136/255 |
| 2011/0087306 A1* | 4/2011 | Goossen | A61N 1/3718 |
| | | | 607/60 |
| 2013/0172698 A1* | 7/2013 | Reynolds | A61B 5/14532 |
| | | | 600/316 |
| 2013/0217420 A1* | 8/2013 | Aoike | H04M 1/72569 |
| | | | 455/456.3 |
| 2013/0241306 A1* | 9/2013 | Aber | H01Q 1/273 |
| | | | 307/104 |
| 2013/0267962 A1* | 10/2013 | Michelson | A61B 17/00 |
| | | | 606/116 |
| 2015/0177056 A1 | 6/2015 | Lian et al. | |
| 2016/0142660 A1* | 5/2016 | Shen | H04N 5/369 |
| | | | 348/162 |

FOREIGN PATENT DOCUMENTS

| | | | |
|---|---|---|---|
| EP | 2835622 A1 * | 2/2015 | G01J 1/429 |
| WO | WO 93/18377 | 9/1993 | |
| WO | WO 01/18510 | 3/2001 | |

OTHER PUBLICATIONS

Zoe Kleinman, "CES 2016: L'Oreal Unveils Super-Thin Smart Skin Patch,", Jan. 6, 2016, http://www.bbc.com/news/technology-35238636 Aug. 11, 2016 (14 pages).

Ultra Violet®: The world's first smart wearable that helps protect you from sun-related sk . . . , http://www.liveultrahealthy.com/, Aug. 11, 2016 (9 pages).

UVA+B SunFriend wearable sun tracker for Safer+Healthier sun exposure!—SunFriend®, http://sunfriend.com/, Aug. 11, 2016.

* cited by examiner

IMPLANTABLE SYSTEMS AND METHODS FOR UV DOSE MONITORING

BACKGROUND

Technical Field

The present disclosure relates generally to the field of implantable sensors, and more particularly, to implantable sensor systems and methods for ultra violet (UV) light dose monitoring.

Background Description

Overexposure to ultra violet (UV) light (e.g., electromagnetic radiation with a wavelength from about 400 nm to about 10 nm), from the sun for example, can have detrimental effects on humans. Both acute and chronic effects are possible. Acute effects may appear within a few hours of exposure while chronic effects may be long lasting, cumulative, and may not appear for years. Acute effects may include, for example, sunburn or redness of the skin (i.e., erythema). Chronic effects may include, for example, premature skin aging and skin cancer. Thus, there has been a continuing need for better UV protection, monitoring, and dose measurement to prevent or reduce the risk of both the acute and chronic detrimental effects of overexposure to UV light.

Wearable UV dose monitors have been developed. For example, UV dose monitors have been integrated into watches, bracelets, or other devices that may be worn or clipped to a person's clothing. Although these wearable UV dose monitors provide at least some means of UV dose monitoring and measuring, there is much room for significant advancement in the technology in order to improve its functionality, accuracy, and usability. The more a person wears a UV dose monitor, the more accurate the UV dose measurement will be. Current wearable UV dose monitors are limited by the locations on the body where they may be worn and are often bulky, hindering consistent use.

SUMMARY

The present disclosure is directed to implantable systems and methods for Ultra violet (UV) light dose monitoring.

In one aspect, the present disclosure is directed to a UV light dose-monitoring system. The system may include an implantable microchip for injection below the surface of a person's skin. The microchip may include a solar cell, a data telemetry transmitter, and a first sensor cell that absorbs UV light that passes through the skin. The system may also include a remote reader. The remote reader may include a data telemetry receiver that receives the data from the microchip and a processor for controlling operation of the remote reader. The data telemetry transmitter may transmit data indicative of a UV light intensity for the UV light absorbed by the first sensor cell to the data telemetry receiver, and the processor may calculate a UV dose based on the data.

In another aspect, the present disclosure is directed to another UV light dose-monitoring system. The system may include an implantable microchip for injection below the surface of a person's skin. The microchip may include a power system that receives power via wireless energy transmission and a data telemetry transmitter that wirelessly transmits data. The microchip may also include a first sensor cell that absorbs UV light that passes through the skin. The system may also include a remote reader. The remote reader may include a power source that powers the remote reader and wirelessly delivers power to the microchip via wireless energy transmission. The remote reader may also include a data telemetry receiver that receives the data from the microchip and a processor for controlling operation of the remote reader. The data telemetry transmitter may transmit data indicative of a UV light intensity for the UV light absorbed by the first sensor cell to the data telemetry receiver, and the processor may calculate a UV dose based on the data.

In another aspect, the present disclosure is directed to a method of UV light dose monitoring of a person using an implantable microchip having a sensor system under the surface of the skin of the person. The method may include absorbing UV light that passes through the skin using the sensor system and positioning a remote reader in proximity to the microchip. The method may also include transmitting data indicative of a UV light intensity of the UV light absorbed by the microchip to the remote reader and determining a UV dose based on the data.

DETAILED DESCRIPTION

Reference will now be made in detail to embodiments of the present disclosure, examples of which are illustrated in the accompanying drawings. Where possible, the same reference numbers will be used throughout the drawings to refer to the same or like parts.

Figure 1:
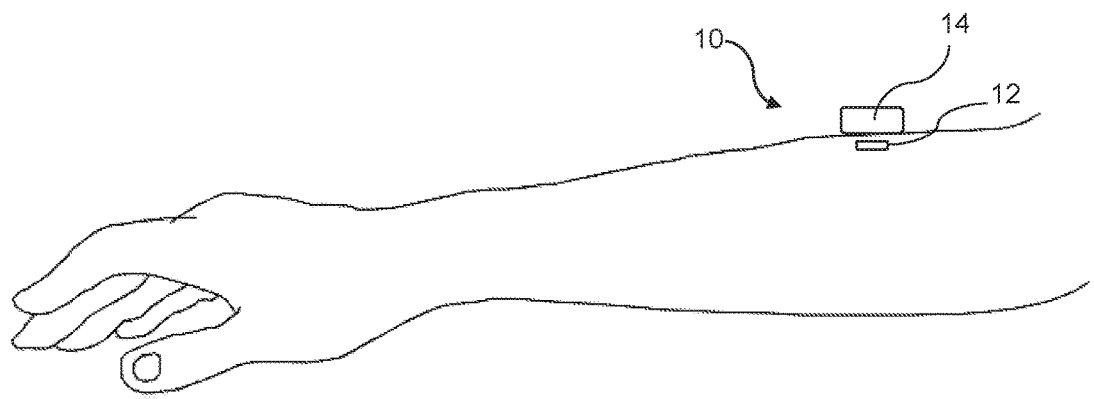
FIG. 1 is a schematic of an ultra violet (UV) light dose monitoring system, according to an exemplary embodiment.

FIG. 1 shows a schematic of an ultra violet (UV) light dose-monitoring system 10, according to an exemplary embodiment. System 10 may include an implantable microchip 12 and a remote reader 14. Microchip 12 may be implanted (e.g., injected) just below the surface of the skin and remote reader 14 may be portable and configured to wirelessly interface with microchip 12. Although FIG. 1 shows microchip 12 implanted in a person's arm, microchip 12 may be implanted in other parts of the body, including for example, the head, torso, legs, feet, and hands. It is noted that the schematic illustration of microchip 12 and remote reader 14 of FIG. 1 is not to scale. The relative size of microchip 12 and remote reader 14 will be described in detail further herein.

Figure 2:
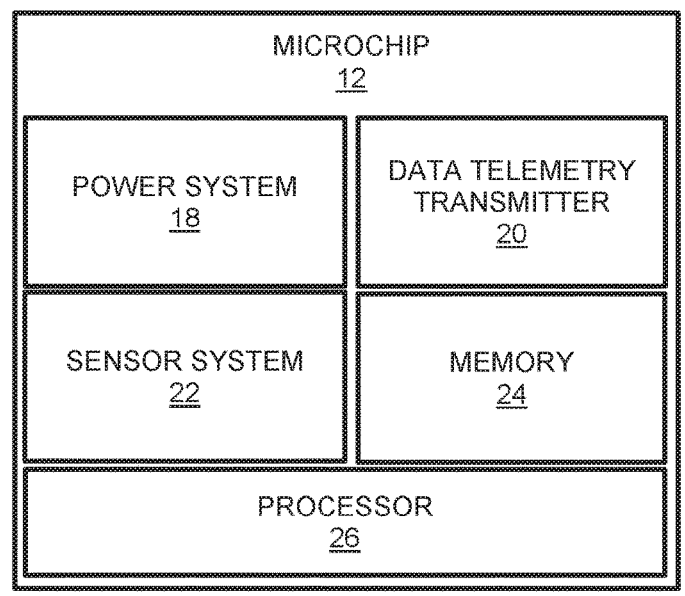
FIG. 2 is a block diagram of a microchip of the ultra violet light dose monitoring system of FIG. 1, according to an exemplary embodiment.

FIG. 2 shows a block diagram of microchip 12, according to an exemplary embodiment. Microchip 12 may be constructed as an integrated circuit and may include a power system 18, a data telemetry transmitter 20, a sensor system 22, a memory 24, and a processor 26. Power system 18 may be configured to power microchip 12. Data telemetry transmitter 20 may be configured to wirelessly communicate with remote reader 14. Sensor system 22 may be configured to absorb UV light that passes through the skin and contacts microchip 12. Sensor system 22 may be configured to output a signal or data, for example, indicative of a UV light intensity of the absorbed UV light. In some embodiments, the UV light intensity may be output as a function of time at a rate, for example, of every 1 second, 3 seconds, 5 seconds, 10 seconds, 30 seconds, 60 seconds, or more. Memory 24 may be configured to store data (e.g., the UV light intensity) while processor 26 may be programmed to control the operation of microchip 12.

UV light intensity may be defined as a measure of the "amount" of UV energy (e.g., mW) absorbed per unit area (e.g., $cm^2$). Thus, light intensity generally or more specifically UV light intensity may be represented in units of $mW/cm^2$ or equivalent units. UV dose, which is discussed in more detail below, is a product of the UV light intensity and the duration of exposure at that intensity. One watt for one second equals one Joule. Consequently UV dose may be represented in units of $mJ/cm^2$ or other equivalent unit.

Figure 3:
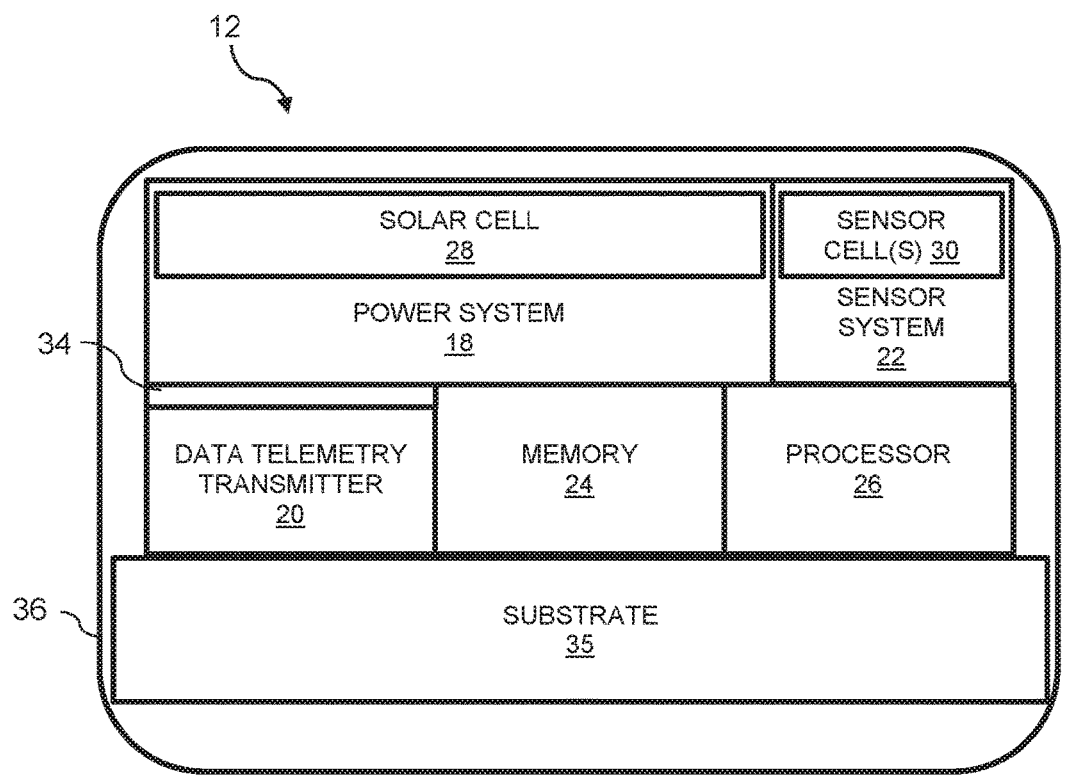
FIG. 3 is a cross-sectional schematic of the microchip of FIG. 2, according to an exemplary embodiment.

FIG. 3. shows a cross-sectional schematic of microchip 12, according to an exemplary embodiment. It is contemplated that the arrangement of the components of microchip 12 may vary.

Power system 18 may include a solar cell 28 that converts light into electricity. For example, in some embodiments, solar cell 28 may be a photovoltaic cell or other similar type of solar cell. The number of solar cells 28 may vary. For example, in some embodiments, power system 18 may have a single solar cell 28 or a plurality of solar cells 28. Light may penetrate through the skin and get absorbed by solar cell 28 and converted into electricity. The electricity generated by solar cell 28 may be used to power microchip 12. In some embodiments, microchip 12 may include a power storage device (not shown), for example, a battery, a capacitor, or other suitable storage device. The power storage device may be designed to store surplus power generated by solar cell 28 for later use when there is no light or insufficient light hitting solar cell 28 to produce the amount of electricity needed to power microchip 12.

Although, microchip 12 may include a power storage device, a power storage device may be optional. For example, embodiments of microchip 12 that do not include a power storage device, may be configured to operate (e.g., absorb and measure UV light intensity) while sufficient light to power microchip 12 is being absorbed by solar cell 28 and may hibernate or go idle when insufficient light (e.g., little or no light) to power microchip 12 is being absorbed. In other words, microchip 12 may be configured to operate (e.g., measure UV light intensity) only when light is present and when a negligible or no light is present microchip 12 may hibernate. This operating arrangement may increase efficiency because it can prevent microchip 12 from attempting to absorb light and measure UV light intensity when there is no light to absorb or measure. In addition, eliminating a power storage device may enable the overall size of microchip 12 to be reduced.

As shown in FIG. 3, data telemetry transmitter 20 may include an antenna 34 configured to wirelessly transmit data (e.g., UV light intensity) from microchip 12 to remote reader 14. Data telemetry transmitter 20 may utilize a variety of wireless data transmission methods for transmitting data to remote reader 14. For example, in some embodiments, data telemetry transmitter 20 may utilize radio data transmission, BLUETOOTH, BLUETOOTH low energy (BLE), BLUETOOTH Smart or BLUETOOTH 4.0, near field communication (NFC), infrared data transmission, electromagnetic induction transmission, and/or other suitable electromagnetic, acoustic, or optical transmission methods. Other protocols are also usable such as WiFi, ZIGBEE, 6LoWPAN or Z-Wave.

Memory 24 may include one or more types of memory, including for example, non-volatile memory and/or volatile memory. In some embodiments, memory 24 may include non-volatile memory so that data stored (e.g., the UV light intensity) will not be lost when microchip 12 hibernates. The non-volatile memory of microchip 24 may be a custom configuration of memory. For example, the non-volatile memory may be configured to sacrifice operating speed for energy savings. In other words, the non-volatile memory may configured to operate at slower speed than standard non-volatile memory (e.g., flash memory), but as a result the energy consumption of the memory may be reduced. In addition, the custom configuration of memory may also be reduced in size by reducing the number of bits. Storing the UV light intensity measurements and operating microchip 12 can be performed with a limited number of bits. Therefore, in order to limit the size of memory 24, the number of bits may correspond to the number of bits used to store the UV light intensity measurements and operate microchip 12. For example, in some embodiments, 8 to 12 bits may be used for storing the accumulated light intensity measurement and another 8 to 12 bits may be used for storing measurement count.

Sensor system 22 may include one or more sensor cells 30 configured for measuring the UV light intensity. Sensor cells 30 may be configured to absorb light (e.g., UV light) that passes through the skin.

In some embodiments, sensor cell 30 may be a photovoltaic cell. The photovoltaic cell may be configured to absorb light including UV light and output a UV light intensity. A total area of sensor cell 30 relative to a total area of solar cell 28 may be small. In some embodiments, the total area of solar cell 28 may be, for example, between 5 to 10 times, 10 to 20 times, 15 to 25 times, the total area of the sensor cell 30. In other words, the majority of the available light absorbing area of microchip may be utilized for powering while a small portion of the available light absorbing area may be utilized for sensing.

Figure 4:
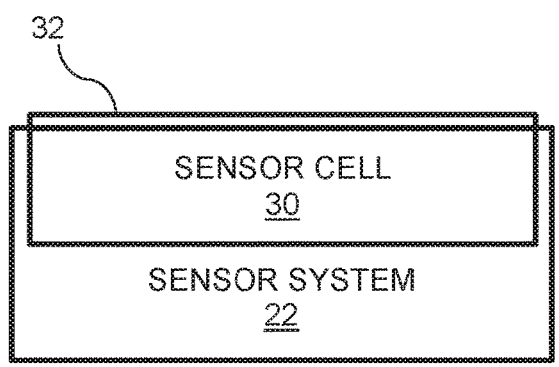
FIG. 4 is a cross-sectional schematic of a sensor system of the microchip of FIG. 3, according to an exemplary embodiment.

Microchip 12 may be configurable for several different sensor system 22 embodiments. For example, a schematic of a first embodiment of sensor system 22 is illustrated in FIG. 4. The first embodiment of sensor system 22 may include one sensor cell 30 (e.g., a first sensor cell) and a UV filtering structure 32. As described herein, in some embodiments sensor cell 28 may be a photovoltaic cell configured to output light intensity based on the light absorbed. UV filtering structure 32 may be positioned to cover sensor cell 28. As a result, UV filtering structure 32 may be configured to enable UV light to pass through UV filtering structure 32 while blocking other forms of light. As a result, UV filtering structure 32 may be configured to only let UV light passes through and reach sensor cell 30. As a result, sensor cell 30 will only absorb UV light and the output of light intensity from sensor cell 30 may represent the UV light intensity.

UV filtering structure 32 may be constructed of multiple layers and each layer is targeted to filter different light ranges. UV filtering structure 32 may have a thickness of about 100 nanometers to a few micrometers.

Figure 5:
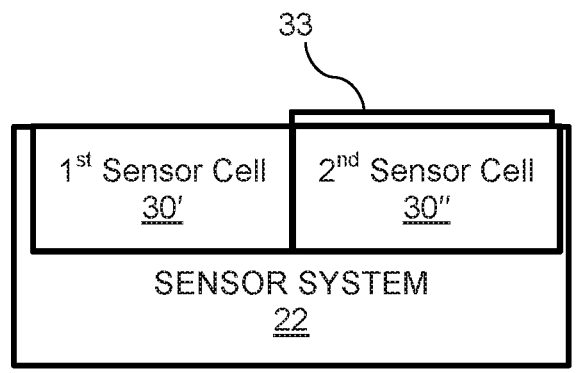
FIG. 5 is a cross-sectional schematic of a sensor system of the microchip of FIG. 3, according to another exemplary embodiment.

A schematic of a second embodiment of sensor system 22 is shown in FIG. 5. The second embodiment of sensor system 22 may include at least two sensor cells (e.g., a first sensor cell 30' and a second sensor cell 30") and a UV light blocking layer 33 that covers one of the sensor cells (e.g., second sensor cell 30"). This configuration of sensor system 22 may enable first sensor cell 30' to absorb all light including UV light and may output a total light intensity while second sensor cell 30" may absorb all light besides UV light, which is blocked by the UV blocking layer 32, and may output a non UV light intensity. The UV light intensity may be determined or calculated as the differential between the total light intensity and the non UV light intensity.

In some embodiments, microchip 12 may be configured to perform this calculation and then store and/or transmit the UV light intensity to remote reader 14. In some embodiments, microchip 12 may store and/or transmit the total light intensity and the non UV light intensity to remote reader 14 and remote reader 14 may calculate the UV light intensity. It is contemplated that the actual component (e.g., microchip 12, remote reader 14, or another device in communication with remote reader 14) performing this calculation or other calculations described herein may vary. Some or all of the calculations may be performed by microchip 12, remote reader 14, or another device in communication with remote reader 14.

In some embodiments, because the UV light intensity may vary over a duration of exposure (e.g., over the course of a minute, an hour, or a day), then the UV dose may be calculated based on an average UV light intensity over the total duration of exposure. For example, if over the course of 8 hours the instantaneous UV light intensity rises and falls then the average UV light intensity over the 8 hours may be used to calculate an average UV dose for those 8 hours. Alternatively, in some embodiments, rather than perform just one UV dose calculation for a duration of exposure (e.g., 8 hours), more advanced calculations may be performed to increase the accuracy of the UV dose measurement over the duration of exposure. For example, the UV light intensity may be plotted as a function of time and the area under the curve may be calculated using definite integrals. Varying the unit of time used for solving the definite integrals between, for example, milliseconds, seconds, and minutes the accuracy of the measurement may be controlled.

In some embodiments, microchip 12 may be formed on a flexible substrate 35, as illustrated in FIG. 3. Flexible substrate 12 may be formed of a variety of materials. For example, flexible substrate may be formed of polyethylene terephthalate (PET), polyimides (PI), silicone, or liquid crystal polymer (LCP). Microchip 12 may be covered with a conformal material coating 36 that surrounds microchip 12 and provides mechanical protection and moisture protection. Conformal material coating 36 may be applied using a variety of techniques including, for example, spin coating, spray coating, dip coating, slot-die coating or other like methods. In some embodiments, conformal material coating 36 may be silicone-based. The thickness of conformal material coating 36 may vary. In some embodiments, conformal material coating 36 may range between, for example, about 5 microns to about 10 microns, about 5 microns to about 15 microns, about 5 microns to about 20 microns, about 10 microns to about 15 microns, about 15 microns to about 20 microns. The material and thickness of conformal material coating 34 may be such that light, including UV light, passes through with little to no filtering (i.e., blocking) of the light. In some embodiments, conformal material coating 36 may be applied to avoid covering the one or more sensor cells 30 of sensor system 22.

Microchip 12 may be sized to avoid or limit pain and/or discomfort from the initial implantation and the subsequent presence of microchip 12 under the skin. For example, in some embodiments the size of microchip 12 may range from about 100 microns to about 500 microns, about 200 microns to about 500 microns, about 300 microns to about 500 microns, about 400 microns to about 500 microns, about 200 microns to about 400 microns, or about 200 microns to about 300 microns. It has been demonstrated there is minimal to no pain or discomfort from implants that are about 500 microns or less.

Figure 6:
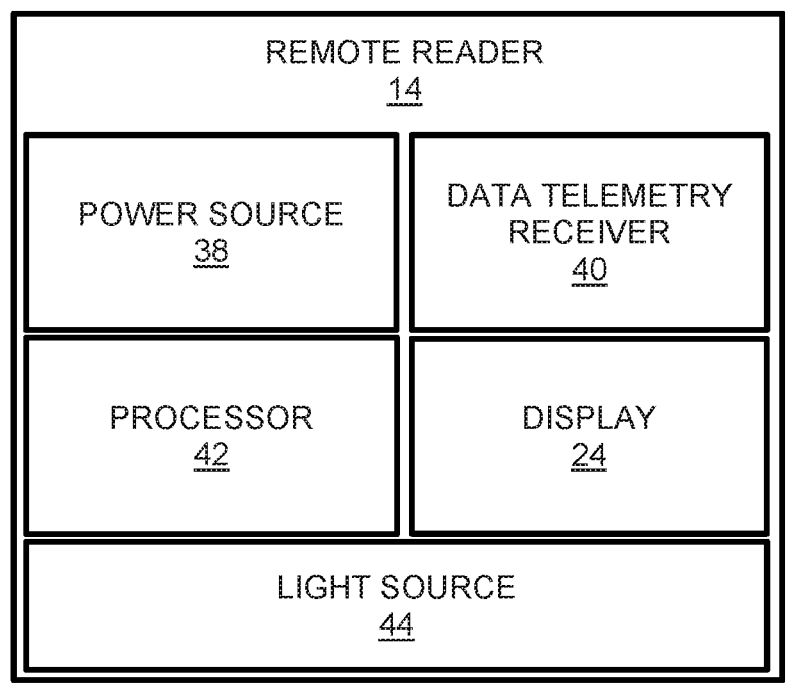
FIG. 6 is a block diagram of a remote reader of the system of FIG. 1, according to an exemplary embodiment.

FIG. 6 shows a block diagram of remote reader 14 of system 10. As shown in FIG. 6, remote reader 14 may include, among other things, a power source 38, a data telemetry receiver 40, and a processor 42. Power source 38 may be configured to provide power for remote reader 14. Data telemetry receiver 40 may be configured to communication or interface with data telemetry transmitter 20. For example, data telemetry receiver 40 may be configured to receive data wirelessly transmitted by data telemetry transmitter 20. Processor 42 may be a programmable processor configured to control the operation of remote reader 14.

Power source 38 may be any suitable type of power source. For example, power source 38 may be a battery, a capacitor, or a connection to a remote power source. A remote power source may be a smart phone or other smart device (e.g., smart watch). In some embodiments the remote power source may be a standard outlet and the electricity may be transmitted via a wired connection.

Data telemetry receiver 40 may be configured to utilize any suitable means of wireless communication including all the methods described above with respect to data telemetry transmitter 20. In some embodiments, the transmission range of the wireless communication may be limited (e.g., to reduce power consumption). As a result, data telemetry transmitter 20 and data telemetry receiver 40 may be configured to transmit and receive data when microchip 12 and remote reader 14 are in close proximity. For example, transmission of data from microchip 12 to remote reader 14 may be limited to when a distance, for example, of less than about 1 meter, less than about 50 centimeters, less than about 10 centimeters, less than about 1 centimeter, or less than about 5 millimeters. For example, remote reader 14 may be configured to initiate data transmission when remote reader 14 is placed on the skin above microchip 12 and the distance between is reduced to less than about 5 millimeters.

Microchip 12 may be configured to detect the presence of remote reader 14 or remote reader 14 may be configured to alert microchip 12 when remote reader 14 is placed above microchip 12. System 10 may be configured such that the detection or alerting may trigger data telemetry transmitter 20 to transmit data. Microchip 12 may be alerted or detect the presence of remote reader 14 in a variety of ways. For example, remote reader 14 may transmit a light signal to microchip 12, which microchip may be programmed to recognize. In some embodiments, data telemetry transmitter 20 and data telemetry receiver 40 may both be transceivers and a signal may be transmitted from remote reader 14 to microchip 12. In some embodiments, radio frequency identification (RFID) may be used to alert microchip 12.

Processor 42 may include one or more processors. Processor 40 may include any suitable standard or custom designed processor. For example, processor 42 may be a central processing unit (CPU). Processor 42 may configured execute a number of different calculations and operations. For example, remote reader 14 may receive the UV light intensity measured by microchip 12 and based on the UV light intensity may calculate the UV dose. Processor may perform other calculations based on the UV light intensity detected, for example, processor may calculate a percent of allowable UV dose remaining (e.g., per hour, per day, per month), a running total of UV dose exposure, a duration of allowable exposure based on UV light intensity before reaching an allowable UV exposure limit.

In some embodiments, remote reader 14 may also include a display 42 configured to display the UV light intensity, the UV dose, and/or the other values calculated by remote reader 14. In some embodiments, remote reader 14 may also include a speaker (now shown) that may be configured to read out the UV light intensity, UV dose, or one of the other calculated values.

In some embodiments, remote reader 14 may be integrated into another device. In some embodiments, remote reader 14 may be integrated into a wearable device. For example, remote reader 14 may be integrated into a smart watch or smart phone. In some embodiments, remote reader 14 may transmit the UV light intensity or UV dose to the remote device, which may upload it to the cloud where it may be accessed by a caregiver or added to a person's medical records. In some embodiments, remote reader 14 may be configured to check the local weather forecast through the smart watch or smart phone and based on the weather may send alerts to the person to check their UV dose based on the weather forecast. For example, on a sunny day with a higher UV index the remote reader 14 may alert the user (e.g., by indicator light, display, or audio indicator) to check their UV dose at a greater frequency than on a less sunny day with a lower UV index.

Remote reader 14 may be configured for periodic placed over the skin above the microchip in order to read the measurements (i.e., receive transmission of data) from the microchip. In between measurement readings remote reader 14 may be stored, for example, on the person in a pocket or bag or may be left at home and the person may elect to take reading measurements at home.

In some embodiments, remote reader 14 may include a light source 44 configured to project light of various wavelengths. Light source 44 may be configured to project light toward microchip 12 when placed on top of the skin above microchip 12. Light source 44 may be configured to trigger transmission of data between microchip 12 and remote reader 14 by projecting, for example, a light of a specific wavelength. In some embodiments, light source 44 may be configured to project light to microchip 12 in order to power microchip 12 for transmission of the data. For example, if it is dark and there is no light to power microchip 12, light source 44 may project light on microchip 12 to power the device. Alternatively, even if there is natural or ambient light for powering microchip 12, light source 44 may project light on microchip 12 because the placement of remote reader 14 may block the natural or ambient light from reaching solar cell 28 of microchip 12. Light source 44 may also be used to calibrate microchip 12. For example, light source 44 may project UV light of one or more controlled intensities and/or wavelengths for a specified duration in order to achieve a known amount of UV exposure and this known amount can be used to calibrate the amount measured by microchip 12. Calibrating may improve the measurement accuracy of system 10 by compensating for a number of different variables, for example, placement depth or angle of microchip 12, skin type, skin age, or life (e.g., degradation) of microchip.

In some embodiments, remote reader 14 may include additional components that may enhance functionality. For example, additional components may include data ports, disk drives, a user interface, computer network interface(s), and/or indicator light(s). In some embodiments, remote reader 14 may also include a wireless network adapter (e.g., WiFi) and an intelligent signal processor enabling secure data communication with other devices over the wireless network. The configuration of remote reader 14 may be adjustable using any combination of hardware and software components.

Figure 7:
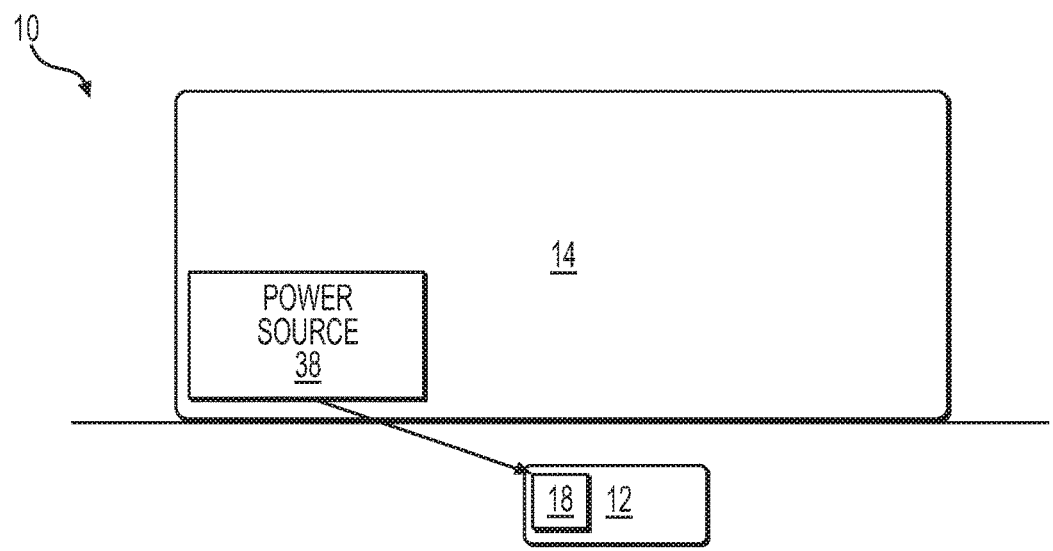
FIG. 7 is a schematic of an ultraviolet light dose monitoring system, according to another exemplary embodiment.

FIG. 7 shows another embodiment of system 10, where microchip 12 may be powered by remote reader 14. For example, power source 38 of remote reader 14 may be configured to wirelessly transmit power to power system 18 of microchip 12 via wireless energy transmission. Power source 38 and power system 18 may utilize, for example, inductive coupling, resonant inductive coupling, radio frequency, or the like to wirelessly transmit power from remote reader 14 and microchip 12. In some embodiments, remote reader 14 may be configured to continuously transmit power to microchip 12 when in a functional range. For example, in some embodiments remote reader 14 may be placed on the surface of the skin above the microchip 12 in order to wirelessly transmit power. For such embodiments, remote reader 14 or a portion of remote reader may be transparent so that when remote reader 14 is sitting on the skin above microchip 12, light may pass through remote reader 14, the person's skin, and get absorbed by sensor system 22.

In some embodiments, remote reader 14 may be configured to transmit power to microchip 12 periodically in order to charge an on board power storage device. In some embodiments, system 10 may be configured such that microchip 12 may be solar powered (e.g., by solar cell 28) and powered by remote reader 14 by wireless energy transmission.

Embodiments of power source 38 configured to wirelessly power microchip 12 may utilize, for example, resonant inductive coupling and may include an oscillator circuit (not shown) and/or a transmitting coil (not shown). The oscillator circuit may be powered by power source 38 and may drive the transmitting coil. In some embodiments, the signal from the oscillator circuit may be amplified by a power amplifier (not shown) which may be coupled through, for example, a capacitor, to the transmitting coil. The transmitting coil may be mutually coupled with a receiving coil in power system 18 of microchip 12. The coupled coils may transfer electromagnetic energy from the transmitting coil through the skin to the receiving coils of microchip 12 by way of mutual induction.

Figure 8:
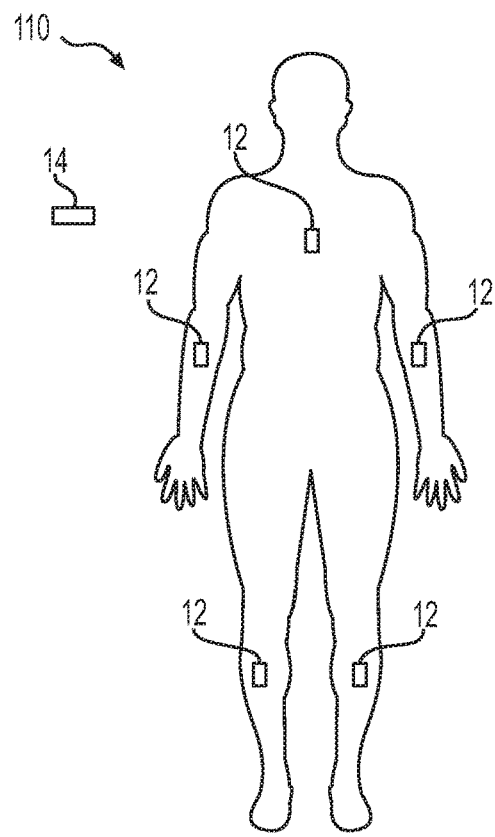
FIG. 8 is a schematic of an ultraviolet light dose monitoring system, according to another exemplary embodiment.

FIG. 8 shows ultra violet light dose monitoring system 10, according to another illustrative embodiment. System 10 shown in FIG. 8 is similar to those shown in FIGS. 1-6, but instead of having just a single microchip 12 and remote reader 14, system 10 may include a plurality of microchips 12 that may be implanted at different locations on a person's body. For example, system 10 may include five microchips 12. One may be implanted on each leg, on each arm, and on the torso. The plurality of microchips 12 may be implanted on portions of the skin most commonly exposed to the sun, for example, below the sleeves or below shorts. The use of multiple microchips may provide a more accurate full-body UV dose measurement. Remote reader 14 may be configured to take each individual measurement from the plurality of microchips 12 and combine them into a single overall (e.g., full-body) UV dose measurement.

Figure 9:
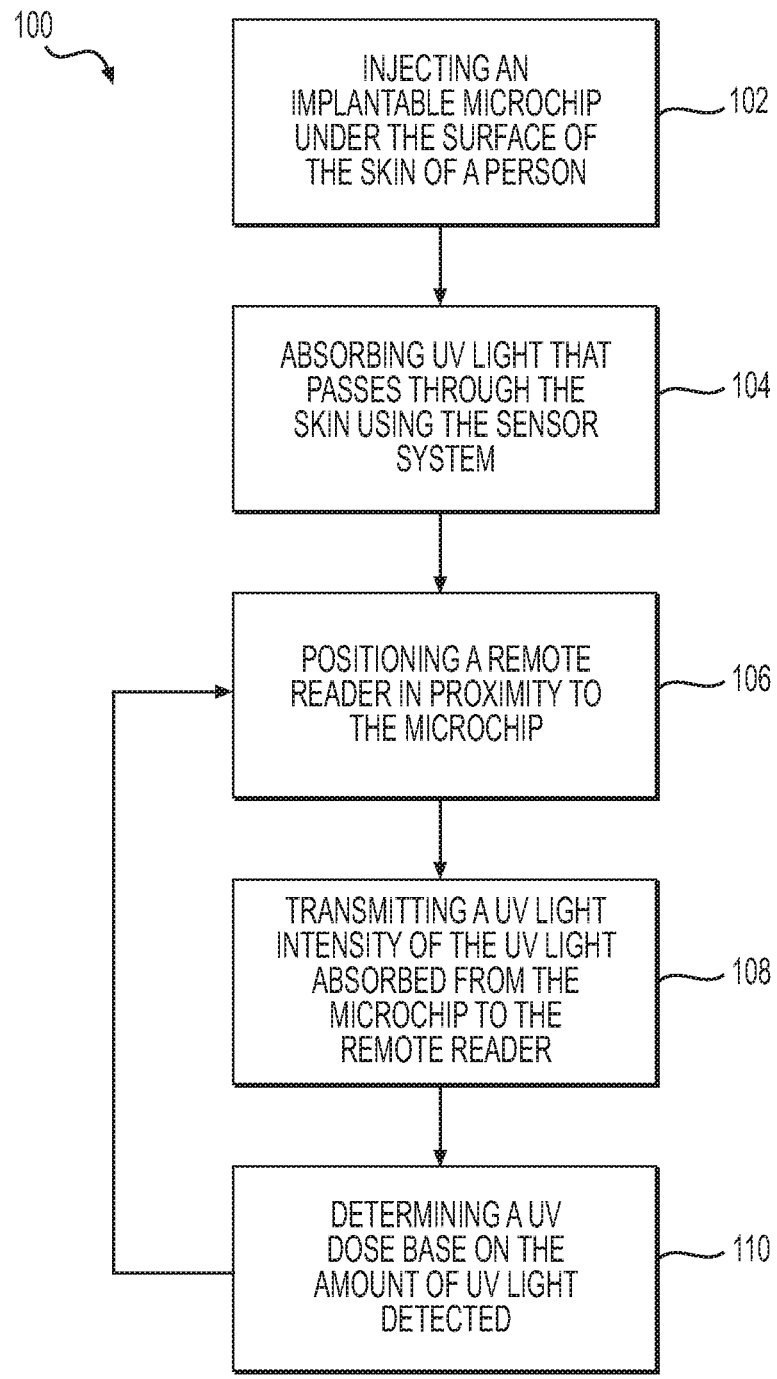
FIG. 9 is a flow chart of a method of UV light dose monitoring, according to an exemplary embodiment.

The various embodiments of system 10 as described herein may be utilized for a variety of methods of UV light dose monitoring for a person. Various methods of utilizing system 10 will now be explained with reference to FIG. 9.

According to an exemplary embodiment, system 10 may be utilized for a method 100 of UV light dose monitoring. Method 100 may start with injecting implantable microchip 12 under the surface of the skin of a person, at step 402. Microchip 12 may be injected under the skin in a variety of ways. For example, injecting microchip 12 may include vacuuming up a section of skin so the section of skin is raised above the rest. The next step of injecting microchip 12 may be to pierce the section of raised skin from the side with a cannula or other hollow tube that contains the implantable microchip. Once the cannula is in place a plunger may be slide down the inside of the cannula to place the microchip and then the cannula may be withdrawn. By coming in from the side this method of injecting microchip 12 may enable implantation of microchip 12 without damaging the skin above microchip 12, which could affect light penetration through the skin. In some embodiments, step 402 may be repeated for additional microchips 12 if system 10 is utilizing multiple microchips 12.

Next, step 104 may include microchip 12 absorbing UV light that passes through the skin using sensor system 22. As described herein, microchip 12 may intermittently or continuously absorb UV light dependent on the light environment the person and microchip 12 is exposed to. While absorbing UV light microchip 12 may be configured to output the UV light intensity as a function of time, which may be stored in memory 24.

According to method 100, periodically the person with the implanted microchip 12, or another person, may position remote reader 14 in relative proximity to microchip 12, at step 106. Once in position, at step 108, microchip 12 may transmit data (e.g., the UV light intensity) to remote reader 14. At step 110, the UV dose may be determined based on the data indicative of the UV light intensity. As described herein, in some embodiments, the UV dose and other calculated values may be calculated by microchip 12, remote reader 14, and/or another remote device.

Steps 106-110 may be repeated and the frequency at which they are repeated may be determined by the person. For example, a person may elect to position remote reader 14 just once a day (e.g., at the end of the day) triggering steps 106-110 or a person may elect to position remote reader 14 once every few minutes or few hours, thereby getting a UV dose reading more frequently. For example, a person that is outside on a sunny day may be more concerned with their UV exposure and as a result may elect to check their UV dose every hour to ensure they are not getting over exposed. In contrast, on a cloudy and/or rainy day a person may be less concerned about their UV exposure and as a result may elect to check their UV dose every hour.

Although the present disclosure describes systems and methods for monitoring UV exposure with the goal of limiting a person's UV exposure below a threshold, it is understood that the systems and methods described herein may also be employed for monitoring UV exposure so a person reaches a minimum UV exposure threshold (e.g., to ensure they are getting enough vitamin D via UV light). UV exposure is known to have beneficial effects as well as detrimental effects. Therefore, there is a need not just for systems and methods to monitor UV light exposure to prevent or limit overexposure, but there is also a need for systems and methods to monitor UV light underexposure. Accordingly, the systems and methods described herein may be used to monitor both underexposure and/or overexposure of a person to UV. For example, multiple sclerosis (MS) patients are frequently vitamin D deficient.

Although the systems and methods described herein are described primarily with reference to an implantable microchip. It is contemplated that embodiments may include microchips that are not implanted.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include methods of manufacturing flexible electronic circuits, but the approaches may be used to manufacture other electronic circuits and components as well.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. In addition, while certain components of implantable microchip 12 and remote reader 14 have be described as being coupled to other components in particular, any such components of these devices may be coupled together.

Computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

The invention claimed is:

1. An ultra violet (UV) light dose monitoring system, comprising:
an implantable microchip for injection below a surface of a person's skin, the microchip comprising:
a solar cell;
a data telemetry transmitter;
a first light sensor configured to absorb UV light;
non-volatile memory configured to store UV light intensity information; and
a processor in communication with the first light sensor to:
receive a light sensor signal indicative of a UV light intensity absorbed by the first light sensor,
store sensed UV light intensities in the non-volatile memory, and
in response to receiving a signal from a remote reader, cause the data telemetry transmitter to transmit one or more of the stored UV light intensities.

2. The system of claim 1, wherein the microchip further includes a non-UV filter disposed over the first light sensor, the non-UV filter configured to allow UV light to pass while blocking other forms of light.

3. The system of claim 1, wherein:
the microchip has a second light sensor that is covered by an UV filter configured to block UV light;
the first light sensor is configured to absorb light including UV light and output a total light intensity;
the second light sensor is configured to absorb light and outputs a non UV light intensity; and
the processor is further configured to calculate the UV light intensity by determining a difference between the total light intensity and the non UV light intensity.

4. The system of claim 1, wherein the microchip further comprises a conformal material coating that covers the microchip and has a thickness between about 5 microns and about 15 microns thick.

5. The system of claim 1, wherein the solar cell and the first light sensor are photovoltaic cells.

6. The system of claim 1, wherein an area of the solar cell is between 15 and 25 times an area of the first light sensor.

7. The system of claim 1, wherein the microchip is a monolithic chip and the microchip is between about 200 microns and 500 microns in width.

8. The system of claim 1, further comprising the remote reader, the remote reader comprising:
a data telemetry receiver to receive the UV light intensities from the microchip; and
a processor configured to calculate a UV dose based on the UV light intensities.

9. The system of claim 8, wherein the remote reader is integrated into a wearable device configured to display at least one of the UV light intensity, the UV dose, or a percentage of allowable UV dose.

10. The system of claim 8, further comprising a plurality of the implantable microchips.

11. The system of claim 8, wherein the remote reader is configured to transmit at least one of the UV light intensity and the UV dose to a smart phone.

12. An ultra violet (UV) light dose monitoring system, comprising:
an implantable microchip for injection below a surface of a person's skin, the microchip comprising:
a power system that receives power via wireless energy transmission;
a data telemetry transmitter;
a first light sensor that absorbs UV light that passes through the skin;
non-volatile memory configured to store UV light intensity information; and
a processor in communication with the first light sensor to:
receive a light sensor signal indicative of a UV light intensity absorbed by the first light sensor,
store sensed UV light intensities in the non-volatile memory, and
in response to receiving a signal from a remote reader, cause the data telemetry transmitter to transmit at least one of the stored UV light intensities.

13. The system of claim 12, wherein the microchip further includes a non-UV filter disposed over the first light sensor, the non-UV filter configured to allow UV light to pass while blocking other forms of light.

14. The system of claim 12, wherein:
the microchip has a second light sensor that is covered by an UV filter configured to block UV light;
the first light sensor is configured to absorb light including UV light and output a total light intensity;
the second light sensor is configured to absorb light and outputs a non UV light intensity; and
the processor is further configured to calculate the UV light intensity by determining a difference between the total light intensity and the non UV light intensity.

15. The system of claim 14, wherein the first light sensor and the second light sensor each comprise one or more photovoltaic cells.

16. The system of claim 12, further comprising a remote reader, the remote reader comprising:
a power source that powers the remote reader and wirelessly delivers power to the microchip via wireless energy transmission;
a data telemetry receiver to receive the UV light intensities from the microchip; and
a processor configured to calculate a UV dose based on the UV light intensities.

17. The system of claim 16, wherein the remote reader comprises a transparent panel, the transparent panel configured to align with a microchip disposed beneath the remote reader and allow UV light to pass through the remote reader and be detected by the first light sensor.

18. A method of UV light dose monitoring of a person using an implantable microchip having a sensor system under a surface of a person's skin, comprising:
absorbing, by a UV sensor implanted under the surface of the person's skin, UV light that passes through the person's skin, the implantable microchip comprising:
a solar cell;
a data telemetry transmitter;
the UV sensor configured to absorb UV light;
non-volatile memory configured to store UV light intensity information; and a processor in communication with the UV sensor to:
  receive a light sensor signal indicative of a UV light intensity absorbed by the UV sensor,
  store sensed UV light intensities in the non-volatile memory, and in response to receiving a signal from a remote reader, cause the data telemetry transmitter to transmit one or more of the stored UV light intensities;
determining an amount of UV light absorbed by the UV sensor; and
storing the determined amount of UV light in the non-volatile memory in the implantable microchip.

19. The method of claim 18, further comprising injecting the implantable microchip, which includes:
  applying suction to a section of the person's skin to raise a section of skin;
  piercing the section of skin from the side with a cannula containing the implantable microchip; and
  injecting the implantable microchip into the section skin without damaging the person's skin above the microchip.

20. The method of claim 18, further comprising:
positioning the remote reader in proximity to the microchip;
transmitting data indicative of a UV light intensity of the UV light absorbed by the microchip to the remote reader; and
determining a UV dose based on the data.

21. The method of claim 20, further comprising:
periodically positioning the remote reader in proximity to the microchip;
obtaining the determined amount of UV light from the non-volatile memory in the microchip;
uploading the UV dose to a remote computing device; and
displaying at least one of the UV light intensity and the UV dose via the remote reader.

* * * * *